Patented Apr. 7, 1942

2,278,470

UNITED STATES PATENT OFFICE 2,278,470

STARCHY FOOD MATERIALS

Albert Musher, New York, N. Y., assignor, by mesne assignments, to Food Manufacturing Corporation, Chicago, Ill., a corporation of New York No Drawing. Application July 18, 1939, Serial No. 285,083

6 Claims. (Cl. 99—104)

The present invention relates to food products and it particularly relates to food products of a relatively high starch content, and it further relates to the preparation of these materials so that they may have new qualities such as increased tenderness, quick cookability, and better nutritional and digestible qualities.

This invention is applicable to foodstuffs which have a relatively high water content in their original condition such as, for instance, in excess of 35% to 50%. Also, it is applicable to food materials which in their natural condition have a lower water content, and even a relatively low content, or even when, in their original condition, they are in the form of hard pieces, as for instance, rice, oats, corn, wheat, and so forth.

A relatively high moisture content food material cannot generally be stored over periods of time without the possibility of spoilage due to fermentation, mold growth, and other forms of deterioration, unless it is subjected to various forms of protection, as for instance, refrigeration, or dehydration.

However, if these high water containing, high starch food materials such as potatoes or peas are dehydrated, they become quite difficult to prepare or cook, because of the fact that in the dehydrating procedure, as well as in the storage that follows, there is a tendency for the starchy material that is within these foods to cake, and to become hard and compacted, and therefore, the entire food piece becomes quite resistant to the influence of boiling or hot water when it is boiled or cooked.

Because of the formation of this toughness or hardness in these dehydrated high starch food pieces, long cooking procedures as well as long soaking procedures are necessary in order to place the food in condition for consumption.

Aside from the inconvenience and difficulty in preparing foods from these dehydrated high starch products, there are frequently lost, because of the long cooking procedures that are necessary, many of the flavors, essences, vitamins, and other valuable qualities and characteristics of the food.

Still further, various explosion and expansion procedures have heretofore been utilized in conjunction with high starch materials. This explosion procedure comprises subjecting the high starch food materials, as for instance, rice, to relatively higher temperatures and pressures, and then instantaneously releasing the materials to a substantially lower temperature and pressure.

The result however that is obtained in the utilization of this explosion procedure may vary with the type of product, the type of starch contained therein, whether or not a substantial amount of protein is present therein, and so forth.

With high starch products, one of the results of the explosion procedure is the gelatinization of starch, and the resulting substantial swelling of this starch that takes place. When a substantial amount or all of the starch in these foods becomes gelatinized and expanded, there results the loss of the general characteristics of the original food material. Also, particularly where a relatively higher amount of insoluble starch is present, there results a relatively soft quality in the food that is of a substantially collapsible nature when it is treated in water, so as thereby to produce substantial disintegration or loss of unity when the food material is then cooked or otherwise prepared with water or aqueous material.

It is therefore among the objects of the present invention to provide improved high starch food materials and methods and processes for preparing them so that they may be placed into a relatively more quickly cookable, or more tender, or more easily preparable condition, with new qualities such as improved digestibility and nutritional qualities.

A further object of this invention is to produce food products of high starch content, and which, in their exploded condition, will not be of the quality that will substantially disintegrate or that will result in a collapsible mushy material due to the gelatinization and the extensive swelling of the high starch that is present.

A still further object of this invention is to produce originally high water, high starch materials into a dehydrated condition, whereby they will be relatively quicker cookable without the usual compactness or toughness that takes place following this dehydration or drying process.

A still further object is to produce originally low water content high starch materials such as seeds, grains, and cereals as for instance rice, wheat, etc., in a condition whereby they will be of relatively quicker cooking quality, but that will retain substantially more of their original size and shape than heretofore produced in their exploded condition.

Still further objects and advantages will appear in the more detailed description set forth below, it being understood however, that this more detailed description is given by way of illustration and explanation only and not by way of limitation, since various changes therein may be made by those skilled in the art without departing from the scope and spirit of the present invention.

It has now been found that the above objects may be accomplished by removing all, or a good quantity, or whatever amount of starch that it is required to remove from these high starch food materials, by various processes as for instance by washing, by enzymic action, and so forth, followed by dehydrating the food materials that have a relatively high water content therein either due to their original condition or due to the processes involved herein, and then following this by exploding these starch-reduced materials in order to render them more quickly cookable, or with such other qualities as herein described. The use of this process in conjunction with water washing, freezing, cooking, enzymic action, boiling in concentrated sugar solutions, boiling in salt solutions, steaming, roasting, and other operations as herein described, either singly or in combination with one or more of each other, or other processes, will produce products of new and enhanced qualities.

The removal of the required amount of starch from the products of this invention is essential in view of the fact that these products have, in their original condition, prior to the removal of any starch therefrom, a starch content in excess of 10% to 15%, and generally in excess of 20% to 25%, and in many cases even over 35% or 40%, these figures being based upon the dry weight of the products.

In the carrying out of this invention many food materials as for instance, rice, wheat, oatmeal, and so forth, and also various types of dehydrated foods as for instance dehydrated peas, may contain insufficient moisture in the event that the product is going to be frozen, or given various other treatments that require moisture to be present. In these cases the required amount of moisture may be added by soaking, or by cooking or steaming the food to be treated, and then the procedure may proceed in the same manner as applies to water containing food materials.

In the further carrying out of this invention, the starch contained within these high starch food materials may be removed partially, or to a larger extent, by various methods as for instance soaking the product in water or other aqueous materials, using continuous water washings, or single, or repeated water washings, boiling with a sufficient quantity of water, using enzymes as for instance diastatic enzymes or various enzymes to convert the starches into sugars, etc., or by soaking in or washing with salt solutions, etc., and by various other methods. Generally, it is advisable, in the removal of the starch, not to boil or heat the starch foods so as to gelatinize the starch therein, but rather to wash out the required amount of starch with cold or warm water or other aqueous materials, and thereby so as to keep the starch below its gelatinization point.

In general, the starch-removal treatment may consist of any method for partially or wholly changing, modifying, transforming, or converting the starch into a relatively non-gelatinizable product, or into a more readily removable product. Also, any method may be used which will remove or inactivate the starch partially or wholly by washing, freezing, and so forth.

Although the amount of starch that remains in the end product will depend largely upon the characteristics of the food that is treated, the method used, and so forth, nevertheless, it is generally desired that in the end product of this invention that the starch content should be less than 25% or 30%, and most generally less than 15% or 20%, and in many cases the high starch materials of this invention may be treated so that the end product will contain less than 5% or 10% of starch.

Also, in the removal of the starch from food materials which are of relatively large size, as for instance, potatoes, the food materials should advantageously be cut into relatively small pieces so as to enable the water or other washing, or starch-removed material, to more easily gain entrance into the structure, thereby, so as to more easily remove the starch therefrom or transform or modify the starch therein.

Following the removal of the required amount of starch, the food material, if it then contains a relatively high amount of water, as for instance, over 35% to 50%, should be reduced by drying or dehydrating to a relatively low moisture content as for instance below 30% to 35%, and generally below 15% to 20%, or even below 8% to 10%.

When dehydrating the feed materials of this invention, any of the various drying methods may be used, as for instance, heat, or hot air, at such a temperature and for such a length of time so as to reduce the moisture content to the required amount. However, it is generally desirable, and care should be taken in the dehydrating of these food materials to keep the heating temperatures and the general dehydrating conditions below the point at which the gelatinization of the remaining starch within the food product will gelatinize.

Also, the drying process should remove the required amount of water content from the food product preferably without causing substantially any change in the wholeness or unity of the food pieces.

The dehydrated material containing a relatively reduced quantity of moisture as for instance, below 10% to 15%, is then subjected to an expansion or explosion procedure which will soften, or separate, or disrupt the cell structure, or the entire food structure.

According to this procedure, the substantially dehydrated food material is then subjected to a treatment at relatively elevated temperatures and pressures. For best results the pressure should usually be above 20 or 25 pounds per square inch and preferably should be above 40 or 50 pounds per square inch and in some cases it may run as high as 300 or 400 pounds, or more per square inch.

Generally the temperature should be above 200° F. to 250° F. and it may run above 700° F. to 800° F. The general range is usually around 400° F. or 500° F.

This explosion treatment is carried on for a time period and at a pressure and temperature depending upon a number of factors as for instance, the moisture present in the food product, the softness of the food product, the degree of expansion desired, the type of equipment used, whether dry heat or steam or superheated steam is used for the expansion chamber, the time, temperature and pressure conditions themselves, and similar other factors.

The required time for exposure may be 18 to 20 minutes or longer, or it may be under ten minutes and even less than several minutes, whereas in many cases it may be under one minute, and often several seconds or 15 to 45 seconds will suffice to complete the treatment and to give the best result.

An example of the time, temperature, and pressure conditions that may be used under various conditions with a product such as potatoes for instance, after the starch has been removed, and the product dehydrated in accord with this invention, would be to subject the pieces of potato to a temperature, for instance, of about 450° F., in an atmosphere of superheated steam at a pressure of 50 pounds per square inch for a time period of 15 or 20 seconds, and then, at the end of this time, to instantaneously open the chamber so as to release the potato pieces therefrom.

The amount of moisture withdrawn or removed before expansion or explosion should be such as to give the best results to carry out the expansion process. With a large number of food products it is preferred to reduce the moisture content of the foods to between about 4% and 20%.

If the product to be exploded is a little too dry, additional moisture may be added to the product or to the expanding chamber, as for example, in the form of water or other aqueous material, or in the form of steam or preferably superheated steam.

This expansion or explosion treatment in its generally preferred embodiment is carried out in a steam atmosphere and this steam may be developed by various methods as for instance, from the moisture within the food that is being processed, or by the injection into the pressure chamber of steam, etc. This steam may be controlled so as to maintain or change the moisture content of the food being treated so as to obtain the best results. The moisture added may also consist of, or include, fruit, vegetable, meat, or other juices derived by extraction, expression, or cooking.

After this treatment at elevated temperatures and pressures, the food material is suddenly and instantaneously released to atmospheric pressure and temperature or to substantially lower pressures and temperatures, as for instance by opening the particular vessel in which these foods have been treated whether such vessel be of the form of an autoclave, a pressure gun, or some other suitable apparatus.

After the food pieces have been treated in accord with the process described herein, it is found that the texture and structure thereof has been substantially changed so as to be in a substantially more readily cookable or more tender condition. Furthermore, by controlling the conditions of temperatures, pressure, time, etc., this quickly cookable condition can be adjusted so as not to produce any substantial decrease or modification in the content of vitamins, flavors, essences, or other food essentials.

It is found that these food materials are now in a condition where their compact structure has been to a large degree, torn, separated, or softtened, and that a large number of passages and pores have been formed, many of which are greater than capillary size, and many of which are of a connecting or communicating nature.

These passages and pores, and the increased water absorbent nature of the product, now permits water to more readily penetrate into the food piece particularly at elevated boiling temperatures. These new porous food materials may now be placed in hot or boiling mater, and they will be very much more readily and quickly cooked. When cooked, they will have desirable characteristics of the cooked food, which ordinarily would have required prolonged boiling, or, in the case of dried foods, which would have required long soaking procedures, or even longer boiling operations.

Furthermore, the flavors and essences and aromas of the cooked foods are greatly enhanced. It appears that the water of the boiling medium has the opportunity of entering into the interstices between and into the separated portions and into the pores, openings and cells, and of developing the flavors therein to a much higher degree than would result from prolonged boiling of the original unexpanded product.

With the dehydrated and expanded or exploded food products of the present invention there is a tremendously greater contact between the boiling liquid and the expanded food material. Even with a relatively very short boil which in some cases may be as little as two or three minutes there is much superior contact over a tremendously greater area between the liquid and the food material than heretofore resulted from even prolonged boiling periods of the same material in its original unexpanded and unseparated condition. The increase in surface area of the food, including interior exposed areas, amounts in many cases from 100% to 1000% or more.

The size, porosity and other characteristics of the food materials made under this invention may be controlled by varying such factors as the extent of dehydration, the temperature of the expansion treatment, the time of the explosion treatment and the pressure to which the food pieces are subjected during such explosion treatment.

Also the atmospheric conditions to which the foods are subsequently subjected upon ejection from the pressure chamber or gun will also largely control the porosity and characteristics of the dehydrated and expanded food pieces. It is also possible to control the expansion, porosity, etc., and to develop variations or new characteristics and qualities in the treated foods of this invention by ejecting them from the pressure chamber into atmospheres having higher or lower pressures than atmospheric or into a partial or complete vacuum, and also into various atmospheres which may contain carbon dioxide, nitrogen, or ozone, or even quantities of oil or aqueous vapors.

Although this procedure of explosion, disruption or expansion is carried out in one step, it may be also carried out in a plurality of steps in which case the same, or different temperatures and pressures and time periods may be utilized. For example, the food material may be subjected to 1 or 2 or 3 or more explosion or expansion treatments of the character above described at temperatures and at pressures, and for time periods that are the same, or higher, or lower, than each other.

In many cases, for instance, a multiple expansion procedure at a lower temperature and/or pressure has advantages over a single explosion at a higher temperature and/or pressure, because, in this way the time, temperature, and pressure of multiple explosion processes may be so regulated that each explosion of the multiple process is not sufficient to provide the full cooking or tenderizing quality that is desired, but relatively less intense explosions take place, which, in the aggregate, will result in the cookability or softness required, without the disadvantages of loss of flavor, excessive disruption of structure, etc.

It is desirable at times to place a coating on or within the pieces of food products so as to permit the formation of harder walls and thereby so as to result in a greater or more efficient explosion of the product. Starch, resins, sugars, gums, and similar materials may be used to provide such a coating.

The food products treated with the explosion procedure of this invention may be ejected from the pressure chamber, if desired, into oil or molten fat, or into molten sugar, or into fatty or other vapors, or into atmospheres of nitrogen, carbon dioxide, or other inert gases, etc. These embodiments may be used to aid in retention of flavors, retarding or elimination of discoloration, oxidation, etc.

Also, where desired, the food pieces may be cut or pulverized, after this process, and then if desired, they may be dipped into or coated with a plastic or molten fat, etc., to retard discoloration, etc.

An important advantage of the present invention resides in the fact that the dehydration followed by the separation and expansion treatment will separate the fibrous or resinous or similar structure of the products so that the digestion qualities of these exploded food materials will be greatly improved. This is particularly important in view of the fact that some foods are of an indigestible quality due to their toughened nature which will hereby be avoided or lessened to a remarkable degree.

Moreover, the various food materials which may be treated by the dehydration and explosion treatment of the present invention and various food compositions made therefrom are most advantageously cooked because of the fact that they do not immediately sink to the bottom of the vessel to the same extent as the untreated foods. Because of their relatively spongy quality, they float to an extent during the cooking operation and do not sink so quickly to the bottom of the pot and thereby they do not burn so readily. Also they will be much more quickly saturated with the boiling or cooking liquid as the case may be during the short boil procedure.

The relatively porous structure which results under this invention to various food products has an important advantage in that it may be used to absorb various types of flavors or essences such as vegetable or meat extracts or flavoring solutions and then it may be subsequently dehydrated or dried so that the expanded food piece will contain within itself the flavors or other materials which it may be desired to add to the food.

The food pieces which are obtained after explosion, may be coated, impregnated, or otherwise treated to render them less susceptible to oxidation or deterioration, or to enable them to retain therein, moisture, flavor, and softness of the food pieces, and so as to enhance the quality of being more readily cookable to form a final cooked preparation.

For example, the resulting foodstuff, after the procedure above outlined, may be coated with various preservatives, or protectives against deterioration, either dry, or mixed with liquid materials, or they may be coated with fats or oils, at reduced or increased temperatures, or they may be dusted or coated or impregnated with flavoring materials such as sugar, salt, condiments, essential oils, extracts, various types of flavors, etc., either in dry or liquid or dissolved form.

In many cases an increased amount of starch may be removed, or the starch removing operation may be enhanced by water-washing or by soaking out the starch as hereinbefore described, and then, subjecting the food piece to the dehydration and explosion procedure as herein described in many cases, preferably in the form of a mild, less violent explosion procedure, and then again soaking or washing or otherwise removing the starch therefrom.

The advantage of this procedure is that by the explosion operation the structure of the food piece is expanded or opened up so that the water or aqueous material of the washing procedure may more easily and more completely get into the structure of the food piece and thereby enable a more thorough washing of the starch therefrom.

Likewise, in many cases, it is possible even before the first washing, to give the food pieces a relatively mild explosion treatment at reduced temperatures and pressures and for reduced time limits, so as to loosen or open the structure thereof, and thereby so as to permit more easy ingress of the water thereinto so as to permit a better and thorough washing of the starch therefrom.

By the use of this invention as herein described, there is now produced, quite unexpectedly, quick cookable or tenderized food materials which have relatively the same edible qualities and characteristics in their cooked form as they had in their high starch form, but which now are exploded so as to be in a relatively more quickly cookable condition. Also, notwithstanding their original high starch condition, the foods are now, quite unexpectedly, without the usual collapsible, mushy, unity-destroyed condition when they are placed in their cooked condition. The tendency in these new food pieces produced from high starch materials is now for the formation of a relatively porous structure, with passages and interstices, many of which are of a connecting nature, and with a quality that will enable the food pieces to retain their required unity when cooked in water.

It is in many cases desirable to coat, impregnate or otherwise protect the food products of this invention with protective materials and particularly with water repellent materials such as oils and fats, and preferably with fats which are in a plastic or hardened condition at room temperature. However, under various conditions, various other materials or combinations thereof may be used for impregnation, coating, etc., as for instance, sugar, preferably when it is of a quickly dissolvable nature.

In many cases it has been found desirable to make either an oil-in-water emulsion or a water-in-oil emulsion, but preferably a water-in-fat emulsion, to be used as the protective coating for various food pieces, particularly where briquetting is to be one of the results. An example of a water-in-fat emulsion consists of an emulsion or emulsion-like product of a sugar syrup mixed with a molten hard fat which is then mixed until the hard fat congeals sufficiently to hold the sugar syrup in emulsified form. This material may be used for coating as well as for binding purposes.

Examples of fats or oils that may be used in the various embodiments of this invention are the vegetable stearins such as cocoanut oil stearin, cotton oil stearin, palm kernel stearin, etc., hydrogenated cottonseed oils, animal fats, olive oil, corn oil, peanut oil, sesame oil, lard, oleostearin, or other fats or oils, hydrogenated or natural, etc., or combinations of these or other fats and oils, etc. Mineral waxes, paraffin, etc., may also be used in certain cases for specific admixtures or applications, although in edible products, the use of these materials are desired only in small amounts.

Fats of a hardened or plastic nature, such as those described above, may also be used where required as binding agents, where it is desired to form the food materials of this invention either by themselves or in conjunction with other food materials, into cakes, briquettes, or other food units.

Preferably, however, when the food materials of this invention, either with or without other food materials are formed into such food units, for the purpose of resulting in a quick cooking food brick it is preferable to use as the binding agent, binders which will not readily cake or harden, but rather binders which will very quickly disintegrate and melt or dissolve, etc., so as to provide for quick disintegration of the food bricks or units and thereby so as to promote quick cookability. The preferable binders for this purpose are plastic, or preferably hard fats, and sugars, either alone, or in combination with each other.

Where sugars are used, they should be of a non-crystallizable nature, or when crystallized, they should be in the form of small crystals with passages and pores throughout, so as to enable quick dissolution, or the sugar may be combined with other materials such as glycerine, etc., in order to produce water retaining, or non-crystallizable quality.

For the purpose of briquetting the various food materials of this invention, the various binder materials that are used may be used separately or may be combined in order to produce the best results. For example, an emulsion of the molten hard fat and the sugar syrup may be made where required. Also, if desired, and particularly where hygroscopic materials are present, the molten hard fat may be used as the protective coating for the hygroscopic materials which are congealed therein, and then the sugar syrup or other sugar materials may be used as the binding agent, so that the aqueous nature of the sugar syrup does not affect the water absorbent qualities of the hygroscopic material. Still further, where desired, the molded food unit, which is bound by a sugar syrup, and in which the pieces have been coated with a fat- or wax-like water repellent material, may be placed for 15 minutes to 1 hour, for instance, into a temperature above the melting point of the water repellent material, and preferably just above this melting point, so as to form laminations, etc., and thereby so as to form a more durable food unit, when congealed.

The advantage of having food pieces which have pores, or passageways, is that, particularly as far as briquetting is concerned, these pores or passageways act as a good medium for anchoring the binding agent within each piece, and thereby form a much more substantial food brick.

When molten hard fat is used for instance either as a binding agent or as a protective, it is sometimes desirable to add this molten hard fat at higher temperatures as for instance 200° F. to 220° F., or higher so as to get a more complete fat coverage, and also in some cases it is desirable immediately after adding the molten hard fat to give the product a quick chill so as to congeal the hard fat as quickly as possible and thereby get as thorough a coating as possible of the hard fat upon the surfaces, and within the interstices and pores of the food pieces. Also in some cases it is desirable to keep the food material for a length of time in the molten fat at the higher temperatures.

In some cases also it may be desirable to use fat of various melting points at different stages in the operations of impregnation or briquetting or coating, as for instance a molten hard fat with a melting point of 100° F. may be used for the purpose of impregnating the food pieces and forming them into a briquette and a molten hard fat of a melting point of for example 120° F. may be used to coat the finished briquette. The result of this will be to give more resistance against atmospheric temperatures on the outside of the briquette, but also to result in a quicker disintegration of the food brick when placed into hot water for cooking.

As noted herein, where it is desired to include hygroscopic materials, such as powdered milk, etc., in a food brick, particularly in conjunction with food pieces which are then treated with aqueous binders or materials such as glucose syrup, etc., it is desirable to coat the milk powder or other hygroscopic materials with a molten hard fat, wax, or other similar water repellent material so as to avoid contamination of the hygroscopic materials with the aqueous nature of the binder or other materials that are used.

In the making of food briquettes, it is often desired to enhance the cooking qualities of the food brick by aerating the food by whipping air or inert gases into the fatty material or into the other materials that are used for binding agents, or by otherwise introducing air into the brick.

Also mixtures of dry effervescent materials such as sodium bicarbonate and tartaric acid may be mixed into the food bricks so that when the brick is cooked, the effervescent agents will combine to form a gas which will result in the brick rising to the surface of the water so as to enable quicker and more effective cooking procedure.

Also, the inclusion of effervescent materials within the brick provide for more ready disintegration of the brick upon cooking, in view of the fact that the effervescent materials, upon coming in contact with water, tend to push the various food particles apart so as to permit quick disintegration, and thereby so as to retard the development of lumpiness or caking.

The products treated under this invention should first be sufficiently dehydrated before they are exploded, in order to produce sufficient body and strength so as to withstand the explosion process, without disintegration and so as to retain substantially their unity in structure.

Furthermore, it is advantageous to cut the larger food materials, such as potatoes, before dehydrating and explosion, or before explosion, so that their interior portions will be more exposed, and so that these materials will be in relatively smaller pieces. As a result of cutting these materials into smaller portions, the resultant product will have enhanced cookability in view of the fact that there will tend to be formed more widely distributed pores and exploded portions.

Still further, in the explosion of these reduced starch food materials, the resultant pieces are in more or less irregular and uneven shapes, as compared with exploded high starchy materials, as for instance, exploded rice. This is due to the fact that the explosion in these reduced starch materials takes place unevenly and forms uneven pores and passages throughout the pieces.

Also, these reduced starch food pieces are relatively form-sustaining when treated with water, after explosion, as compared with high starch materials which are substantially collapsible when treated with water, after explosion.

The resultant product that is produced as the end product of this invention, may be of various moisture contents, but it usually has been found that it is preferred to have at least 2% to 3% of moisture in the final product or to have above 5% to 8% moisture in the final product so as to enable more ready cookability which is not readily available when the product is entirely dried out. This also has the advantage of enabling the retention of at least some of the water soluble flavors, so as to enhance the flavor element.

In many cases it is desirable to treat reduced starch food pieces, so as not to fully explode them so as to provide for very quick cookability, but rather, the food pieces are first dehydrated and then are exploded relatively lightly, so as to expand, or open up or separate their structure relatively moderately. This will produce a food piece which has been only moderately treated, but which will have many advantages.

Aside from the dehydration and explosion procedures that are used, as disclosed herein, so as to enhance the structure, fiber or cell disruption of the food material, other methods of enhancement may be used in conjunction with this explosion process. For instance, there may be used operations involving soaking or boiling the food pieces in oil or fat, freezing, cooking, steaming, ageing, or using enzymes, digestives, etc., which processes may be used singly, or in various combinations.

These procedures may be used at various points, as for instance, preliminary to, after, or as an accessory to the explosion operation, so as to further soften the fibers and structure and enhance quick cookability or tenderizing quality.

As a possible embodiment of this invention, the food materials may be cooked or steamed, so as to rupture or soften the fiber or cell structure of the food material, and then this food material may be dehydrated to a sufficiently low moisture content so as to enable the proper expansion or explosion operation.

As noted herein, the cooking of the high starch materials of this invention should preferably take place after the required amount of starch has been removed from the food material, or at least after a fairly good portion of the required amount has been removed. This will then enable the cooking operation to take place with the minimum amount of gelatinization of the starch material, so that there will be eliminated the disadvantages that accrue from this gelatinization.

It is preferable in carrying out the cooking embodiment of this invention to control this precooking process so as to retain as much as possible of the water soluble flavors and other flavors, essences and qualities of the food product. This is usually done by such methods, as, for instance, cooking or steaming under vacuum, or under pressure, etc., or in the presence of inert gases such as carbon dioxide, nitrogen, etc. Also, if desired, the product may be cooked in a high concentration of its own juice, or other aqueous materials may be used instead of water, for this boiling procedure. Also if desired a waterless cooker may be used for this cooking operation.

It is generally desirable however, that at the end of the cooking operation, no free water or at least a very small amount of free water remains, because it is obviously desired that as much of the flavor of the food product as possible be retained or re-absorbed back into the food, rather than have it in the exterior aqueous material. However, if any excess aqueous material remains, it may be dehydrated if desired and the dehydrated material placed along with the food product in order to enhance the food flavor.

This cooking operation may be carried on for such a period of time so as to produce the required softness, and generally it is preferred to continue this cooking or steaming operation to the point that the product is in a relatively soft condition.

Aside from cooking and steaming, other methods of cooking, as for instance, induction heating, may be used under conditions of various pressures and temperatures, or in conjunction with other cooking or steaming processes.

In the various cooking treatments that are herein described, the water should be present, preferably in sufficient amount so as to be substantially throughout the entire food, and preferably it should be distributed as uniformly as possible so that in the cooking or steaming operation, the entire structure of the food will be affected.

Various repeated cookings may be used to enhance the procedure herein described, or combinations of various cookings, at various temperatures, and under various conditions of vacuum, pressure, etc., in varied sequence, may be used if desired in order to produce the desired amount of softening, or structure or cell disruption.

Following this cooking procedure, the food materials may be dried, preparatory to explosion, or they may be otherwise treated, as required.

Another embodiment of this invention that may be used in order to enhance the resultant quality of the reduced starch food pieces of this invention, is to subject these food materials to a freezing operation, and particularly to a slow freezing operation, which will have the effect of rupturing the cells, or softening the fiber and cell structure of the materials.

The fluid that is contained within the cells of the food pieces can be frozen so as to produce relatively large ice crystals. These ice crystals are produced not only in the cell itself but also in the space between the cells, and they begin to form, as the temperature is lowered below 32° F. As the temperature is slowly reduced the ice crystals will become larger and will thereby break or rupture the cell and body structure of the food pieces. This thereby results in a food piece, which, particularly when dried, and exploded, will be relatively more water absorbable, and therefore more quickly cookable, or which will be of a softer, or more digestible quality.

In subjecting these food materials to a freezing operation, the amount of moisture, and the temperatures that are required in order to produce the best results may vary depending upon the degree of softening and rupturing of the cell structure that is required, or upon the nature of the food materials being treated, or upon other conditions. However, it has been found that very good results are obtained usually when the moisture content varies for example, between 30% and 95%, but particularly when the moisture content is over 30% to 40%. Likewise it has been found desirable in many cases, in order to obtain the best results, to permit the freezing to take place slowly at temperatures ranging between 0° F. and 32° F., although in many cases preferred temperatures run down to minus 20° F. and minus 40° F. and lower. Varying temperatures, further, may be used for varying lengths of time.

In general it should be said that it is desirable to carry out the freezing treatment in such a way that there will not be the formation of small fine ice crystals with the consequent lack of rupture of the cells and structure, but rather that there should be the formation of relatively large ice crystals sufficient to puncture, break, rupture or disrupt the cell structure, or the food structure, substantially throughout the body of the particular material being treated.

The freezing usually takes place at ordinary atmospheric pressure but it may take place under conditions of pressure or vacuum. At times vacuum or pressure is of advantage in that the structure and cell disruption is enhanced by such methods.

The water content in the foods should be present in sufficient amount so that it is carried substantially throughout the food, and preferably, it should be as uniformly distributed as possible, so that when the freezing operation takes place, the entire structure of the food piece will be affected.

It is preferred to have the water present not only in its relatively free form in the food, but also within the cells, or in bound water form. It is usually quite preferred in this embodiment of this invention to treat the food materials by cooking, steaming, or similar other operations prior to the freezing operation so as to soften, break, or burst all or a good part of the cellular and/or fiber structure of the food pieces. In this manner, as much of the bound water as possible is released, so that the cell walls are broken wherever possible, and also so that additional softening of these fibers can take place previous to the freezing operation.

In connection with the freezing procedures, as well as with the cooking and steaming procedures that are involved, the position of the water in the various foodstuffs is quite important, and as pertains to these various embodiments, this position of the water is utilized to advantage.

The bound water which is contained within the cell structure may be utilized for the purpose of breaking the cell walls so as to soften this structure and so as to facilitate entrance into the cells, of the cooking water, whereas the relatively free water between the cells and fibers may be utilized for the purpose of disrupting and separating the cells and body structure so as to enable the easy entrance of the cooking water between the fibers, and thereby so as to enable quick cooking or tenderized characteristics. This is accomplished in this embodiment by the relatively slow freezing operation or by other operations which result in the formation of large ice crystals within the food so as to rupture the cells and structure of the foodstuff.

As a general rule the temperature may be lowered gradually, slowly, or in steps to temperatures below 32° F. or if desired there may be a relatively faster decrease in temperature say to 20° F. or 25° F. and then this temperature, after a period, may be decreased further, if desired.

Sudden changes in temperature from higher, to lower, to higher temperatures, etc., with repetition, and with heat, as required, are quite effective as thermal shocks to produce or enhance cell and structure disruption.

In any case however the temperature reduction should be carried out in such a way that the ice crystals will not tend to be of a small, fine crystal formation which will not disrupt the structure of the food.

As one procedure, for example, which may be readily applied to various kinds of food materials of this invention, the temperature may be suddenly lowered from 32° F. to 25° F. and kept there for a period of say one to two hours. Then the temperature may be gradually lowered to about 15° F. and maintained there for a period of an hour or two hours, or longer if required, and then a further treatment at 0° F., for example may be given, if desired. Following this, the freezing operation will be complete, if the cell structure is sufficiently broken, or longer periods of time may be required at various temperatures.

If desired, depending upon the character and degree of the structure softening or disruption that is required, it is desirable in many cases to let the food material, during the freezing operation, come back to 32° F. or higher temperatures, so as to melt all or a good part of the ice crystals, and then, to subject the food material again to a freezing procedure. This may be repeated one or more times, as required.

Where there is insufficient water in the cells or fiber structure, or where it is desired to enhance the disruption of the cells or structure, even when the foodstuff contains relatively high percentages of water it is often desirable to force even more water into the cells so as to burst or soften the cells, or so as to enable, during the freezing operation, the formation of ice crystals in the relatively free water that is outside of the cell structure. This further absorption or enhancement by additional water is accomplished by steaming, cooking, and other similar procedures, under pressure, vacuum, or room temperature, or by various similar methods. Permitting the product to cook or steam in its own juice or in high concentrations of its own juice offers new advantages in flavor and other characteristics.

Various repeated cookings may be used to enhance this procedure, or combinations of various cookings intermingled with various freezings, in varied sequence, if desired, and other combinations may be used in order to produce the desired amount of softening, or fiber or cell disruption.

Following this freezing operation, the food materials are then dried, preparatory to explosion, or are otherwise processed, as required.

In view of the fact that relatively large ice crystals are formed in this freezing embodiment, it is generally advisable, in thawing these products, to thaw them relatively slowly, and rather completely, before drying them or cooking them, or otherwise processing them. If these frozen food pieces are thawed quickly, there is a tendency for a part of the juice and flavor which they contain to seep out, part of which may be lost, whereas if the thawing is allowed to proceed slowly, a fairly good part of this seepage material is allowed to be re-absorbed by the food pieces. This is particularly important in the case of originally high water food materials.

In carrying out the various embodiments of this invention, it is desirable to cut the food materials, into smaller pieces, and process them in this condition in accord with this invention. Particularly is this desirable where it is desired to have quicker or more complete and more thorough penetration of the cooking, steaming, explosion or other procedures herein described.

It is desirable in many cases to freeze the product prior to the removal of the starch therefrom. In these cases, the freezing of the material as herein described, with sufficient water therein, will tend to expand the food piece and will have a tendency to rupture or break the cells as disclosed herein, and there will then be enabled an enhanced method for removing the starch therefrom. These starch materials may then be removed by washing, soaking, or by the other procedures as herein described.

A further embodiment that may be used in producing new and enhanced products, is to boil or cook the high starch materials in sugar solutions or syrups that are of sufficient concentration so as to reduce or eliminate the expansion or explosion of the starch cells within the product. For instance 700 grams of granulated sugar and 600 grams of water may be made into a syrup by heating to a temperature of about 140° F. Add to this 75 grams of raw rice and cook for 15 minutes. It will be noted that the resultant rice is in a relatively unexploded condition.

This cooking procedure in concentrated sugars, or in some cases, in thick gum, pectin, or similar concentrated solutions, may take place at various points in the procedure herein disclosed, but generally the preferred procedure is to have it take place after the first water washing of the starch, or after the first starch removal operation. After the sugar cooking operation, the sugar syrup is generally washed off the high starch food materials, and these materials are subjected to further starch washing or starch removal operations. This accessory sugar solution cooking operation provides further enhanced quality of the food as for instance enabling further starch removal, or the production of further softening qualities, and so forth.

For the drying procedure of the various embodiments of this invention, it is desirable to carry out the drying in such a way that the food materials will oxidize as little as possible. For this reason the drying may be carried out, if desired, under vacuum, or in an atmosphere of carbon dioxide or nitrogen, or in other inert atmospheres.

Desirably the drying temperatures may vary for example from 80° F. to 170° F., or more or less, depending upon whether vacuum is used, the degree of dryness that is required or the general characteristics of the food material that is being dried, or whether more or less starch is in the product, or depending upon other results or characteristics desired. However, for most purposes the general temperatures of dehydration may run for example between 90° F. and 140° F., and the length of time for dehydration necessarily depends upon the amount of dehydration required, the temperature, and other conditions. This drying or heating process should generally be carried on so as not to gelatinize the starch that is contained therein or so as to gelatinize it as little as possible.

Instead of drying the food materials in a dry heat, at the various points throughout the procedures as described herein, these food materials may be placed into a liquid oil or into a molten hard fat and dried to the required moisture content. The molten hard fat in which the food materials are boiled or dried may be allowed to congeal, particularly by quick chilling, so as to immediately harden around the food pieces and thereby so as to act as a water repellent in order to keep as much moisture as possible within the food pieces, and also so as to more fully retain the softness of the fiber structure.

This drying with fats or oils usually takes place preferably at not too high temperatures, so as to avoid loss of flavor, etc. The molten hard fat can then congeal around the food pieces immediately after the required moisture has been evaporated, and thereby will provide a condition whereby a fat protection will take place immediately after the required amount of moisture has been evaporated, so that there will be relatively little or no oxidation or other deterioration effects taking place from the time the product has been dried until it is protected with the fat.

Although the usually preferred procedure, generally, in the carrying out of various embodiments of this invention, is to first remove the desired amount of starch from the food, and then to cook or steam if required, and then freeze, if required, and then dehydrate and expand or explode, nevertheless, depending upon the conditions available, the result that it is desired to accomplish, the characteristics of the food, and other considerations, this sequence may be varied from time to time as required. Also various of these operations may be repeated as required in order to enhance this procedure.

It is generally found with reduced starch food materials that freezing, cooking, steaming, or enzymic action, as described herein, when combined with the explosion process, produce different, and many times, they produce much more acceptable products from the standpoint of quicker cookability than is produced with an explosion process alone.

In fact, in many cases, a considerably less intense explosion may be given to the food pieces when these accessory treatments are used, in view of the fact that the structure of the food piece has been to a large degree softened or disrupted by the use of freezing, cooking, or the other procedures. Thereby, the explosion procedure is required primarily for the purpose of expanding or opening up the food pieces, so as to more quickly permit the quick entrance of water into the structure thereof, rather than for the purpose of fiber and cell disruption.

Furthermore, in the process of violent explosion, there is not utilized the slow cooking, or slow fiber softening quality such as is produced when the cooking operation, for instance, is used in conjunction with a less intense explosion or expansion. These slow cooking or pre-softening procedures are quite important with many foods in order to produce properly cooked foods.

Also, by the use of various accessory treatments as for instance freezing, there appears to be a tendency to still further affect any starch that may remain within the food piece, so that in the final product there will be an even reduced tendency towards caking, lumping, or hardening.

In the cooking or freezing procedures, or separately from these procedures, various concentrations of salt and/or sugar, etc., may be used in order to produce various curing effects, for the purposes of preservation, softening, or producing various food characteristics that may be required. Also pickling, or other food procedures may be utilized as required.

With reference to curing operations in conjunction with the food materials of this invention, the explosion procedures herein described are advantageously utilized in that this explosion opens up the structure of the food material and thereby enhances the curing operation by providing quicker and more thorough penetration and curing.

Although explosion, as described herein, is utilized mainly in conjunction with the food pieces after the excessive amount of moisture has been reduced from them, and preferably when these food pieces are of a moisture content below 30% to 35%, nevertheless, this explosion may take place while the food retains a relatively high moisture content. Also, this type of explosion may take place before, after, or in conjunction with the steaming, cooking, freezing or other operations, or this explosion may be given to the food while it is in its raw high-water state prior to any cooking, steaming, or freezing, etc.

The purpose of this type of explosion is different from the explosion procedure mentioned herein wherein the product is first dehydrated. The procedure heretofore mentioned, which takes place with a product of reduced moisture content, results in an expansion of the product, so as to produce expanded, porous materials. However, the purpose of the present outlined procedure, with the high water content present, is to tear the fibers away from each other, and to loosen the body, and to tenderize the structure of the food piece, rather than to produce an expanded, porous, very quickly water-permeable product.

Of course the temperature, pressure, length of time, etc., are explosion factors that should be adjusted in this operation so as to aid in providing food pieces which will not result in a more or less disunified, soupy, or shredded mass but will result in the desired product in which the structure is loosened or weakened.

By the use of this high-water-content explosion process, however, the freezing, cooking or steaming operations which may follow are enhanced, since the weakening of the structure enables better and more complete penetration and action by these other procedures. Following these procedures, the food materials should preferably be dehydrated and then exploded in order to produce an expanded quick cookable or softened product.

Because of the structure loosening and weakening that takes place by the use of this explosion process in conjunction with these high water content foods, whether they be potatoes or peas, or whether they be rice or oatmeal which have been boiled to contain sufficient water within them, they may be treated with regular dehydration or quick-freeze processes so as to produce substantially enhanced products in their dehydrated or quick-frozen form.

This explosion procedure in conjunction with food materials of a relatively high moisture content, as for instance, over 35% or 40%, is utilized in the tenderizing of these foods, and so as to enhance particularly the regular so-called quick-freeze processes. The purpose of these quick-freeze processes is to freeze foods so that there will not be formed large crystals, but rather, so that there will be formed small minute ice crystals which will not puncture the cell structure.

The explosion processes herein described to be effected in conjunction with food materials which have a high water content present, are particularly applicable to foods of original high water content as for instance peas and beans.

However, by the use of an explosion procedure with these high water content foods, as herein described, particularly at lower ranges of temperature, pressure, and time limits, there is relatively little, or no disruption of the cell structure when these relatively large amounts of water are present, but there is a separating or loosening of the structure. This operation produces enhanced qualities not only for the tenderizing of the food when it is finally consumed, but also, particularly, this process enables a much quicker quick-freeze operation and an improved product, in view of the softening or loosening of the structure of the food material, etc.

The explosion procedure, however, for the general embodiment of this invention, is used primarily in conjunction with reduced starch materials that have been dehydrated, or that are of a low moisture content, prior to explosion as herein described, and which explosion is for the purpose of disrupting and opening up their interior structure and/or cell structure as much as possible so as to result in a more water-permeable and water-penetratable product with enhanced quick-cooking characteristics.

Still further, at various points throughout the various procedures, enzymes, ferments, or digestives, as for instance, enzymes of the nature of diastase, maltase, invertase, etc., may be utilized for the purpose of aiding in softening or preparing the food piece so as to produce various qualities.

It is generally of advantage to remove the starch, dehydrate and explode or expand the food piece before treating it with enzymes or digestives. This treatment with the enzymes may then consist of placing the food into an aqueous medium containing the enzyme. After the expansion process, the digestive medium is better enabled to get within the structure of the food piece and thereby to more readily and more completely affect the food. The enzyme action may be stopped at whatever point is required, as for example, by heat, or other known methods.

In place of enzymes, other hydrolyzing mediums may be used, as for instance, slightly acidifying the solution in which the product is being heated, etc. Any starch within the high starch foods may further be dextrinized wholly or partially as desired. Also this digestive modification may take place before or after the freezing process, or at various other points in the procedures of this invention, and the product may then be dehydrated, or further treated, as required.

An example of a procedure that may be used to modify the starch content of high starch materials is to boil rice, for instance, in water until it swells in its normal way, and then to treat the boiled or steamed rice with diastase so as to convert the required amount of starch into sugar, and then to dry the rice, and then explode it as herein disclosed. The result will be an entirely new type of rice product in which the required amount of starch has been eliminated by conversion, and which, in its exploded condition, will result in rice which has entirely new and enhanced qualities.

Also, a further embodiment of this invention is to explode the reduced starch food pieces as herein described, and then to permit calcium salts, or other minerals, particularly when carried by a fluid, and also so as to permit various vitamin containing oils or vitamin extracts or vitamin activators to thereby be more readily carried into the pores and interstices of the expanded, relatively porous food pieces. Likewise, these materials may be sealed within the food pieces by the use of a material such as molten hard fat which may be congealed thereon, or by drying the food pieces and thereby drying the materials therein, or by various other methods.

A procedure that may be used, when it is desired to age the food piece, so as to tenderize it, and at the same time so as not to permit the development of undesirable micro-organisms, is to subject the material to a freezing process, which may be either a slow freeze or a quick freeze, and then permit the product to age under these frozen conditions for the desired length of time, in order to age properly and become tenderized as required. After sufficient ageing has taken place, the food piece may be dried after the required amount of starch has been removed, and then it may be exploded as described herein. The advantage of a procedure of this kind is that, in the ageing process, the body and structure becomes softened. Therefore less violent explosion may be used, even to the extent of not actually disrupting the cell structure to relatively any further extent, but only so as to result in the separation, softening, or loosening of the fleshy structure.

In the combination of food materials in which are included various exploded quickly cookable foods as for instance rice, potatoes, and peas, it is desirable that these foods be treated under this invention so that each of them may thereafter be properly cooked in their combined form in relatively the same period of time. It is necessary, therefore, prior to placing these materials into combined form, to subject each of these materials separately to the proper and sufficient treatment so as to enable each of them to have relatively the same cooking time.

However, the processing of each of these materials separately may be eliminated, to a very large extent, by the use of the precooking, prefreezing, and similar accessory treatments as noted herein. By these accessory treatments the food materials may be softened to relatively the same degree, and then, they may be dehydrated and exploded or expanded so as to open them up and thereby so as to permit the ingress of the cooking water. This procedure therefore permits the explosion of a number of different types of food materials together at the same time without the necessity of processing each of them separately under individual conditions of treatment.

Where it is desired to sterilize, or where it is desired to retard or prevent the growth of mold, etc., the food products of this invention after they have been completed, may be subjected to a sterilization procedure in molten fat whereby they may be retained in the molten fat or in a similar product at a sterilizing temperature for the required period of time. Preferably, this should take place in a closed chamber under pressure so that there will be a minimum amount of moisture lost from the food product, particularly if the finished product contains moisture that it is desired to have the product retain in its finished condition, after sterilization.

With reference to the starch reducing operation, this procedure may be produced or enhanced by the use of electrolytic procedures, as for instance by passing a current through the starch containing materials, which have been placed into a salt solution or into other electrolytic solutions. In these cases it may be necssary or advisable, as may be determined by experimentation, depending upon the material that is used, or the type of solution, to adjust the pH by the addition of the required amount of acid or alkali, or also by adjusting the solution within the proper ranges away from the isoelectric point.

Further, the freezing process may be used as described herein, not only for the purpose of rupturing the cells so as to produce softer or more quickly cookable qualities but also, so as to enable enhanced removal of the starch or other materials from the cell structure due to the disruption that has taken place.

Still further, as noted herein, various solutions may be used for enhancing the removal of the starch, as, for instance, the use of alkaline solutions, or acid solutions, as, for example, hydrochloric acid which may be in various strengths as for instance 7% to 10%.

Although it is desirable in many cases not to heat the starch containing material prior to removing the starch therefrom, it is, nevertheless, in various cases, and particularly where there is relatively little insoluble starch present, possible and desirable to explode the starch containing material and then to remove the starch therefrom or convert the starch therein. This enhancement is possible in these cases where explosion takes place prior to removal, because of the relatively expanded or porous condition of the material, and consequently, the converting or removal solution can more easily enter into the interior portions of the product that is being treated. Likewise, starch removal or conversion, and the explosion procedures, may be intermingled in various sequences and for the required number of times, in order to produce the desired result.

In carrying out this invention with starchy food materials that contain amounts of protein, and particularly when this protein is present in relatively higher amounts, it is generally desirable to remove this material or to modify it so that it will not produce a hard or tough structure, or rather, so that the structure of the food material will be softened, or so that it will be made more digestible.

The procedure of removing or converting the protein material may be carried out in various ways. For instance, cold or warm water may be used to wash out these protein materials by soaking the starchy food material in the water, or by repeated washings, etc. Various other washing materials or solvents, etc., may also be used, as for instance, salt water, alcohol, acid materials, alkali materials, and so forth, depending upon the nature of the materials to be extracted and the end results that are desired. In the case of many protein materials, for instance, salt water in a concentration of, for example, 2% to 10%, is a good solvent or extracting solution to use.

Also, in many cases, enzymes are very advantageous in the carrying out of this embodiment. In the case of these protein materials, various proteolytic enzymes, for example, may be used. The enzyme action may be started, and then it may be stopped at the required point by the application of heat or by other means.

The enzymes or other materials may be used to convert the protein material into amino acids, and, in this way, this material may be more readily washed out of the food, or, if desired, the converted materials may be allowed to remain therein in their modified form.

In carrying out this embodiment it is not necessary to convert all of the protein that is present, but a partial amount of this material may be converted, or washed out, or modified, so as to produce the required enhancement of the starchy food material.

Various other procedures, as for instance, hydrolyzing methods may be used to accomplish these results. For example, the protein containing material may be placed into a solution of the proper pH, or which is adjusted within the required ranges of the isoelectric point, and then an electric current may be passed through.

In carrying out the various procedures of this embodiment, the washing, soaking, enzymic, electrolytic, or other treatments may take place before or after the explosion procedures. In many cases it will be found that it is desirable to first explode the material so as to open or increase the porosity of its structure and thereby so as to permit the various solutions to more easily enter and produce the conversion, modification, or removal results.

In many cases, however, it will be found that more of the protein material may be removed by utilizing one of the conversion or removal procedures named herein before the product has been subjected to any heat, because of the tendency of heat to produce coagulation or fixing, for instance, of the protein material, and thereby so as to make it harder to remove this material therefrom. However, this is subject to experimentation in individual cases, because, as noted herein, it may be possible to produce the results desired, after heat has taken place, or after the explosion procedure.

In many cases, of course, a washing or removal procedure may take place after the explosion or heat procedure, or various sequences or repeated combinations of these procedures may take place as required.

Examples of various starchy materials containing proteins are for example the legumes, as for instance, various peas and beans. Also, for various purposes it may be desirable to remove the zein from corn.

Of course, the procedure and the results obtained by the explosion of various starchy food materials is usually different depending upon whether or not the starchy food material contains protein material within its structure as, for instance, the result will be different with legumes such as peas and beans which contain relatively high amounts of protein material, as compared with high starch materials with little or no protein as, for instance, potatoes.

The removal of starch from various food products is particularly important in conjunction with legumes, as, for instance, relatively high starch containing peas and beans, in view of the fact that these legumes have a tendency to become quite hard and tough when they are in a dry condition, apparently due, in good measure, to the starch that is contained within them, as well as to the protein material contained therein. Thereby, in the explosion procedure, they usually require high temperatures and pressures, which has a tendency to destroy or harm various of their edible qualities. However, now, when these legumes are treated in accord with this invention, substantially different types of legumes may be produced, with materially improved quick cookable qualities.

Of considerable importance in the carrying out of this invention is the consideration as to the type and nature of starch granules contained within the food piece. Based upon the type of starch, it is necessary to use a different procedure for handling the food pieces containing each of these different types of starch, or containing substantially different proportions of each of these different kinds of starch. Likewise, entirely different results are obtained with the materials containing the different types of starch.

In general, food materials containing two basic types of starch, namely, alpha amylose and beta amylose. These two different kinds of starch differ greatly in physical and chemical properties. The differences between the alpha and beta amylose may be briefly summarized as follows:

| Alpha Amylose | Beta Amylose |
|---|---|
| 1. Insoluble in water. | 1. Soluble in water over a wide range. |
| 2. Gives a reddish violet or purple color with iodine. | 2. Gives a blue color with iodine. |
| 3. Moves in an electric field. | 3. Does not move in an electric field. |
| 4. On combustion there is left a residue of ash. | 4. On combustion there is left no residue of ash. |
| 5. When completely disintegrated there is a flocculent residue. | 5. When disintegrated there is left a clear solution with the properties of reducing sugar. |

The alpha amylose is the type of starch that is responsible for producing the major differences in products containing this material. In rice starch, for example, there was contained 18.2% of alpha amylose whereas in potato starch there was found only 1.8% of alpha amylose. The difference in the amounts of alpha amylose in these two materials makes it preferable generally to use different procedures for reducing the starch content of potatoes as compared with reducing the starch content of rice. Also, generally, different procedures in the explosion operation are necessary. Also, rice or other starchy cereals, as compared with potatoes, or with beans and peas, result in a different kind of exploded product.

For instance, when rice is exploded, there is produced a very substantially increased mass, due to the presence of a relatively high amount of alpha amylose which is insoluble in water. Apparently, due to the insolubility of this starch, when the gelatinization of the starch takes place in the explosion procedure, this insoluble starch forms a wall or film when it is exploded or expanded. Thereby, there is produced a pasty or gummy wall which, when dry, holds its expanded shape.

On the other hand, in view of the relatively low amount of alpha amylose in potatoes, or in peas and beans, for instance, when these materials are exploded, there is relatively little insoluble starch that is present, and thereby there is not produced the gelatinized or pasty walls which are blown out and which then remain in this expanded form. In fact, in view of this relatively low amount of insoluble starch in potatoes, or in beans and peas, there is, when the explosion takes place, quite unexpectedly, the formation of pores or interstices, particularly after the starch removal or conversion, and generally there is not the collapsible nature that is produced with cereals that contain a relatively high amount of the alpha amylose.

Also, the rings of the potato starch granules, and also those of the pea and bean starch granules are generally complete and are quite distinct as compared with the rings of the starch granules of rice and other cereals, which are generally very faint, and even invisible. This further accounts for the fact that apparently there is greater strength or a different make-up of the starch granules of the potato, and also of the pea and bean. Thereby, this strength offers more resistance against expansion, as compared with the starch granules of rice and other cereals.

With reference to the beta amylose which is quite soluble in water over a wide range, a particular sample of potato starch contained 97.15% of beta amylose, and rice starch contained 81.7%. Therefore, although apparently the alpha amylose is the important feature in the differences between the potato and rice, for instance, nevertheless, some of the differing results are produced by the higher amount of the water soluble starch in the potato as compared with the amount in rice.

Also, the size of the granules and the form of the starch produce considerable difference in gelatinization. There is therefore a difference between the starch in legumes, the starch in potatoes, and particularly as compared with the starch in cereals. Generally, the larger granules begin to gelatinize at lower temperatures, aside from other differences that are present.

If desired, in the starch removal or conversion procedures, specific solvents or converters for either the soluble or insoluble starches may be used, in the event that it is desired to remove or convert only one of these types of starch that are present.

*Example I*

As an example of a procedure for the carrying out of this invention, raw polished rice is placed into about 20 times its volume of water of a temperature of about 60° F. The rice is agitated therein slowly for a period of two hours. The water containing the starch that has become removed from the rice is then drained off and the rice is washed with fresh water to remove any excess of starch thereon. This procedure is then repeated two more times.

Following this treatment with cold water, these three washings are then repeated with water of a temperature of 90° F. and then they are repeated again with water at a temperature of 115° F.

A lesser amount of starch may be removed, and firmer rice pieces may be had by using only one, or possibly two of each of these washings, rather than the three washings noted herein.

Following this treatment the rice of reduced starch content is placed in thin layers into a drying oven where a temperature ranging between 135° F. and 145° F. is maintained for a sufficient period in order to reduce the moisture content in the rice to a moisture of between about 7% to 10%.

The dried rice is then placed into a pressure chamber and is subjected to a temperature of about 500° F. in a superheated steam atmosphere, and to a pressure of 70 pounds per square inch for a period of about 20 seconds. Thereupon, the pressure is immediately released so as to instantaneously eject the rice in an exploded condition from the pressure chamber.

Likewise, barley, oatmeal, wheat, and similar high starch cereal grains may be treated under relatively the same conditions in order to produce the required results.

*Example II*

Raw potatoes are peeled and cut into small pieces of about one-half inch square. These potato pieces are placed in thin layers in a drying oven at a temperature ranging between 135° F. and 140° F., and are allowed to dry to a moisture content ranging between 6% to 12%.

When the potato pieces are of sufficient dryness, they are placed into a pressure chamber and are subjected to a temperature of about 450° F. in a superheated steam atmosphere at a pressure ranging between 50 and 60 pounds per square inch for a time period of about 20 to 30 seconds. Immediately thereafter the pressure chamber is instantaneously opened and the potato pieces are released to atmospheric temperature and pressure.

These exploded potato pieces are then placed into about 10 times their quantity of water of a temperature of about 70° F., and are soaked therein with slow agitation for a period of about 1 or 2 hours. At the end of this time, the water is drained off and the potato pieces are washed so as to remove any excess of starch therefrom. This operation is then repeated 2 more times.

Then, this operation is repeated 2 or 3 more times as may be required in water of a temperature of about 100° F. to 110° F.

If desired, in place of all of these washings, or in place of some of them, the potato pieces may be placed into a solution containing starch-converting enzymes, as for instance, diastase. At the end of about one-half hour to one hour, depending upon the amount of starch it is desired to convert therein, the potato pieces are then washed thoroughly with water in order to remove the enzyme material therefrom, and also in order to remove a good part of the starch-converted material therefrom.

Following either the washing operation noted above, or following the enzyme treatment as described herein, the potato pieces are placed into a drying oven and are dried at a temperature ranging between 135° F. and 145° F. until the moisture content has been reduced to between about 6% and 10%.

Following this drying procedure the potato pieces are placed into a pressure kettle and are subjected to a temperature of about 400° F. and a pressure of about 50 pounds per square inch for a period of about 20 seconds after which they are instantaneously released so as to result in an exploded, structure disrupted product. This resultant product will have unusual and new quick cooking qualities.

*Example III*

The garden variety of peas are shelled, and the peas are subjected to a freezing temperature of about 20° F. for a period of 4 hours and the temperature is then reduced to a temperature of 10° F. for about 3 hours, and then to a temperature of 0° F. for about 1 hour. The reducing of the temperature below 32° F. to the 20° F. temperature, and then from the 20° F. to the 10° F temperature and then to the 0° F. temperature is done gradually and slowly so as to result in the formation of large ice crystals therein, and thereby so as to result thereafter in the disruption of the structure of the peas. At the end of the period of freezing, the peas are allowed to slowly and gradually return to a temperature of about 40° F. or 50° F.

A preferred procedure in many instances is to steam the peas prior to the freezing operation, for instance, at a temperature of 240° F. and at a pressure of 10 pounds per square inch for about 15 minutes.

The peas, following the freezing procedure, may then be placed into a salt solution of a temperature of about 65° F. and of a salt concentration of about 4%. They are slowly agitated therein for a period of about 2 hours. The peas are then drained from the salt solution, and they are thoroughly washed with water. This procedure is repeated 2 more times for periods of two hours each, and then the procedure is repeated again 3 times for 2 hours each with the salt solution at a temperature of 90° F. and then it is repeated 3 more times with the salt solution at a temperature of 115° F. The purpose of these salt water washings is to remove particularly an amount of the protein material therefrom, and also some of the starch and sugar is removed.

Following this operation the peas are placed into a drying oven at a temperature of about 140° F. or 145° F. and are dried to a moisture content ranging between 7% to 10%.

The resulting peas are in a substantially more quickly cookable condition than heretofore possible and have substantially enhanced qualities of edibility.

In order to further enhance the quick cookable quality of the peas, they are subjected to a temperature of about 450° F. at a pressure of about 50 to 60 pounds per square inch for a period of about 20 to 25 seconds and are instantaneously released so as to further disrupt their structure.

At various points in this procedure, various proteolytic enzymes may be applied in an aqueous medium to the peas so as to convert some of the protein material therein into proteoses, or into amino acids. Then this enzyme material and the converted material may be washed from the peas when the desired amount of protein material has been converted.

Various other legumes as for instance beans, and so forth may be treated in accord with the procedure described herein, as well as other protein containing or starch and/or protein containing materials.

*Example IV*

In the carrying out of Example III the washing of the peas so as to remove the protein or starch materials therefrom, following the freezing operation, may give some difficulty in view of the softness of the peas following the freezing procedure. Therefore, in order to enable handling a more firm pea material, the peas, following the freezing procedure, may be dried at a temperature of about 140° F. to 145° F. until their moisture content has been reduced to about 7% to 10%.

Then, the peas may be subjected to an explosion procedure by being placed into a pressure chamber under a temperature of 500° F. and a pressure of about 60 pounds per square inch for about 20 to 30 seconds. Then they are instantaneously released so as to disrupt the structure thereof.

Following this procedure the exploded peas are placed into the proper solvent which may be alcohol, an acid, or an alkali, or which, for instance, in this particular example is a salt solution of about a 4% to 6% salt concentration.

The peas are then slowly agitated in this brine for about 2 to 3 hours with slow and careful agitation so as not to substantially break up the form of the peas. Following this soaking the liquid is drained off and the peas are washed so as to remove any of the excess protein or starch-removed material. This procedure may be continued for 2 or 3 times, with the solution at room temperature, or if desired, the peas may be treated 2 or 3 times with the solution at room temperature followed by 2 or 3 more of these soakings and washings with the solution at a warmer temperature of about 115° F. to 120° F.

The freezing operation of this embodiment may be eliminated, in which event a different quality of peas will be produced. In the event that the freezing is eliminated, the peas are dried to a moisture content of 7% to 10% and are exploded, and thereafter given the protein and/or starch removal treatment as herein described.

In the carrying out of this embodiment, the use of proteolytic enzymes as for instance pepsin, trypsin and so forth may be used in an aqueous medium so as to convert the protein material into a more water soluble material which may thereby be more easily removed, or which at least will not give the hardness-producing effect of the normal protein material.

Following this procedure the peas are dried at a temperature of about 135° F. to 145° F. until the moisture is reduced to about 8% to 12% at which point it will be found that the peas have substantially enhanced quick cookable quality.

However, in order to further enhance quick cookable quality of these peas, they may then be subjected to another explosion procedure as hereinabove described, in order to further expand the structure thereof so as to permit the ingress of water therein in providing enhanced cookability and improved edible quality.

What I claim is:

1. The process of producing a quickly cookable food piece from a starch-containing food material, said process comprising reducing the starch content of the food material by solvent extraction, then drying it, and then disrupting its structure by subjecting it to steam at an elevated temperature and pressure and thereafter instantaneously releasing to a lower temperature and pressure.

2. The process of producing a quickly cookable food piece from a starch-containing food material, said process comprising reducing the starch content of the food material by solubilizing and removing it, then drying it, and then disrupting its structure by subjecting it to steam at an elevated temperature and pressure and thereafter instantaneously releasing to a lower temperature and pressure.

3. The process of producing a quickly cookable food piece from a starch-containing food material, said process comprising reducing the starch content of the food material by aqueous extraction, then drying it, and then disrupting its structure by subjecting it to steam at an elevated temperature and pressure and thereafter instantaneously releasing to a lower temperature and pressure.

4. The process of producing a quickly cookable food piece from a starch-containing food material, said process comprising reducing the starch content of the food material by converting the starch into a water soluble material by the use of an enzyme, then drying it, and then disrupting its structure by subjecting it to steam at an elevated temperature and pressure and thereafter instantaneously releasing to a lower temperature and pressure.

5. The process of producing a quickly cookable potato, said process comprising reducing the starch content of the potato by aqueous extraction, then drying it, and then disrupting its structure by subjecting it to steam at an elevated temperature and pressure and thereafter instantaneously releasing to a lower temperature and pressure.

6. The process of producing a quickly cookable pea, said process comprising reducing the starch content of the pea by aqueous extraction, then drying it, and then disrupting its structure by subjecting it to steam at an elevated temperature and pressure and thereafter instantaneously releasing to a lower temperature and pressure.

ALBERT MUSHER.